April 9, 1957  J. B. WHITE  2,787,836
TOOL AND DIE INDICATOR
Filed Sept. 28, 1953
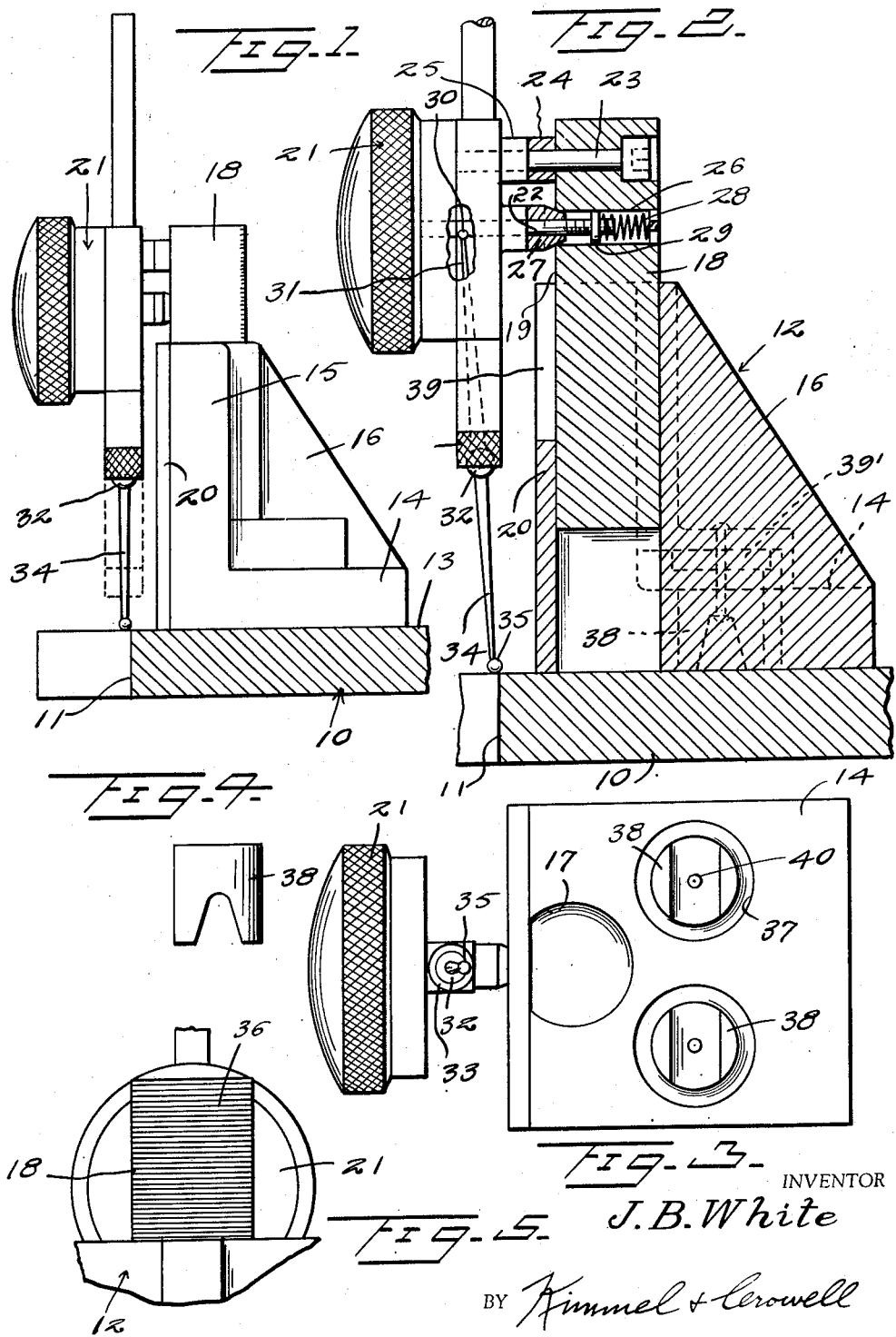
INVENTOR
J. B. White
BY Kimmel & Crowell
ATTORNEYS

United States Patent Office 2,787,836
Patented Apr. 9, 1957

2,787,836

TOOL AND DIE INDICATOR

John B. White, Miami, Fla.

Application September 28, 1953, Serial No. 382,595

2 Claims. (Cl. 33—172)

This invention relates to an instrument or tool for testing dies, jigs or the like.

In the making of dies, tools, jigs or the like it is essential that the article be made within very close tolerances, and that the surfaces of openings, projections or the like be formed as true as possible. It is, therefore, an object of this invention to provide a device which will permit accurate testing of various types of tools, dies, jigs or the like within a minimum of time.

Another object of this invention is to provide a support for a dial type testing instrument which is so constructed and arranged that various types of testing instruments may be used with the support.

A further object of this invention is to provide a support for a testing instrument which includes a pair of permanent magnets which will firmly hold the support to the work piece during the testing operation.

With the above and other objects in view, my invention consists in the arrangement, combination and details of construction disclosed in the drawing and specification, and then more particularly pointed out in the appended claims.

In the drawings:

Figure 1 is a detail side elevation of a tool testing instrument mounted on a support constructed according to an embodiment of this invention.

Figure 2 is a vertical section partly broken away of the device.

Figure 3 is a bottom plan of the device.

Figure 4 is a detail side elevation of one of the permanent magnets.

Figure 5 is a fragmentary rear elevation of the instrument supporting slide.

Referring to the drawing, the numeral 10 designates generally a work piece such as a tool, die, or the like which is provided with an opening or slot 11 to be gauged as will be hereinafter described.

A testing instrument support generally indicated at 12 is mounted on the upper side 13 of the work piece 10, and is formed of a base plate 14 having extending right angularly and upwardly from the forward end thereof a front wall or plate 15. The front wall or plate 15 is braced relative to the base 14 by means of a bracing webbing 16. The front wall 15 is formed with a partly circular vertically disposed guide opening 17 within which a vertically movable slide 18 loosely engages. The slide 18 is substantially round in transverse section and is formed with a flat forward side 19 confronting a plate 20 which is secured to the front of wall 15.

The plate 20 holds the slide 18 against rotation in the guide 17 while permitting free vertical sliding movement of the slide 18.

A testing instrument generally indicated at 21, which in the present instance is constructed similar to the testing instrument shown in Patent No. 2,345,845, issued April 4, 1944, is secured to the slide 18. The instrument 21 includes a plunger 22 which is operatively connected with a spiral operator forming a part of the instrument shown in the patent, supra. The instrument 21 is secured to the slide 18 by means of a bolt or fastening member 23, and a spacer sleeve 24 engages about the bolt 23 between a boss 25 carried by the instrument 21 and the flat front side of slide 18. The slide 18 is formed with a horizontally disposed opening 26 within which plunger 22 loosely engages, and a conical spacer 27 loosely engages about plunger 22 and extends partly into the forward end of opening 26. A spring 28 is disposed in opening 26 and bears against a collar 29 mounted on plunger 22. Plunger 22 within the body of instrument 21 is provided with a notch or recess 30 within which the upper end of a lever 31 loosely engages. The lever 31 is provided with a ball 32 which rockably engages in a ball socket 33. The lever 31 includes a projection or finger 34 having a ball 35 at its lower end which is adapted to engage the surface which is being tested or gauged, such as surface 11. Plate 20 is formed with an elongated vertical slot 39 extending downwardly from the upper end thereof and within which the spacers 24 and 27 loosely engage. The rear side of slide 18 is provided with graduations 36 for determining the relative vertical movement of slide 18. The base 14 is provided with a pair of downwardly opening recesses or sockets 37 within each one of which is positioned a permanent magnet 38. The magnet 38 is of less diameter than the diameter of socket or opening 37 so that no portion of magnet 38 will contact with the base 14. The dielectric washer or spacer 39' is interposed between the upper end of each magnet 38 and the bottom of the socket or recess 37, and a non-magnetic fastening member 40 extends through the magnet 38 and the upper wall of the socket or opening 37. The two magnets 38 extend downwardly to a point where the lower ends thereof are substantially flush with the lower side of the base 14 so that the magnets 38 will be in contact with the upper side 13 of the work piece 10. The two magnets 38 provide a means for firmly holding or clamping the supporting structure to the work piece 10 so that the support will be held against movement relative to the work piece.

In the use and operation of this device the base 14 is disposed on the upper side 13 of the work piece 10 in a position whereby the indicator ball 35 will engage the surface 11 which is being tested as to accuracy. The instrument 21 is moved downwardly with slide 18, and at this time plunger 22 will be under the tension of spring 28 so that the ball or feeler 35 will slidingly contact the surface which is being tested. The various changes in the figuration of surface 11 will be disclosed by the pointer included with instrument 21. It will be understood that other instruments of a like character may be used with the supporting and guiding structure hereinbefore described.

What is claimed is:

1. A tool and die indicator for testing work pieces comprising a vertical support having a front face and a bottom face adapted to engage either the face of a work piece or the surface of a work table, said support having a vertically disposed guide opening substantially round in transverse section but opening through the front face of the support, a substantially cylindrical slide movable in said vertically disposed guide opening and having one flat side, a front plate fixed to the front face of the support and confronting the flat side of the substantially cylindrical slide to retain the slide against rotation, a dial testing instrument vertically disposed, means for connecting said instrument to the upper end of said slide to extend outwardly therefrom and in front of the front plate, and connecting means including a spacer and a bolt extending transversely through the upper end of the slide and the spacer and into the rear of the testing instrument, said testing instrument having an axially movable plunger, said slide having a transverse opening extending below and parallel to said means for securing the instrument to the upper end of the slide, biasing means lying within said transverse opening and reacting against one end of the plunger to urge the outward movement of said plunger, a spacer surrounding said plunger and spacing said instrument from said slide, said spacer entering one end of the transverse opening of the slide, both of the above mentioned spacers being vertically aligned with one another, said front plate having an open vertical slot on its upper part adapted to receive said spacers upon vertical movement of said slide in said support, said testing instrument having a lever with an intermediate ball and ball socket means adjustably receiving said ball, the upper end of said lever engaging with said plunger and the lower end of said lever adapted to engage with a vertical wall of the work piece to be moved thereover.

2. A tool and die indicator as defined in claim 1 and the bottom face of said support having two openings extending upwardly therefrom, cylindrical shaped permanent magnets of less diameter than the openings respectively disposed in said openings, each of said magnets being slotted on its underside to provide the poles of the magnet, a dielectric washer fitted in the top of each of said openings, a non-magnetic fastening member extending from the magnet slot and through the dielectric washer and through the support to secure said magnet in said opening, whereby said magnets are insulatingly spaced from the walls of the said openings, the polar ends of each of said magnets lying flush with the underface of said support and adapted to be attracted to the work piece or the work table.

References Cited in the file of this patent

UNITED STATES PATENTS

| | | |
|---|---|---|
| 1,346,586 | Barber | July 13, 1920 |
| 1,888,454 | Edson | Nov. 22, 1932 |
| 2,280,437 | Levesque | Apr. 21, 1942 |
| 2,345,845 | Wells | Apr. 4, 1944 |

FOREIGN PATENTS

| | | |
|---|---|---|
| 569,599 | Great Britain | May 31, 1945 |